S. & W. W. BALKWILL.

Railway Car-Brakes.

No. 5,271. Reissued Feb. 11, 1873.

Witnesses.
W. H. Finckel
Wm. H. Anderson

Inventors.
S. and W. W. Balkwill,
By Geo. W. Rothwell
Atty.

AM. PHOTO-LITHOGRAPHIC CO. N.Y. (OSBORNE'S PROCESS.)

UNITED STATES PATENT OFFICE.

STEPHEN BALKWILL AND WASHINGTON W. BALKWILL OF CLEVELAND, OHIO.

IMPROVEMENT IN RAILWAY-CAR BRAKES.

Specification forming part of Letters Patent No. 129,880, dated July 30, 1872; reissue No. 5,271, dated February 11, 1873.

*To all whom it may concern:*

Be it known that we, STEPHEN BALKWILL and WASHINGTON W. BALKWILL, of Cleveland, in the county of Cuyahoga and State of Ohio, have invented certain Improvements in Railway-Car Brakes, of which the following is a specification:

Our invention relates to that class of brakes in which the power applied to stop the momentum is exerted to tighten the friction-bands on cones secured to the wheel or axle. In some of the brakes of this class, as heretofore constructed, the cones have been formed upon or secured to the axle in such a manner that the axle has broken almost invariably at the point where it received the strain resulting from the action of the brake, and often after very short use. In most if not all brakes in which the cones are attached to the wheels or fixed near them on the axle, the friction-bands have been fitted to work outward from the center, so that in operation there is a tendency to force off or loosen the wheel from the axle. The object of this invention is to obviate the objections mentioned; and to this end the invention consists, first, in cones cast on the wheels, and combined with friction-bands encircling the cones, and operated substantially as and for the purpose hereinafter described; and, secondly, in the combination with cones, whether cast or otherwise secured to the wheels, of friction-bands adapted to be tightened on said cones by being drawn inward toward the middle of the axle.

Figure 1:
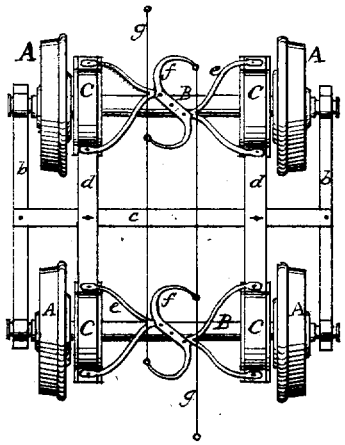
Figure 2:
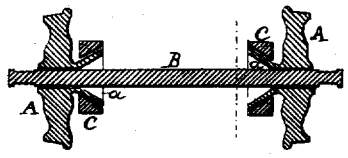
Figure 3:
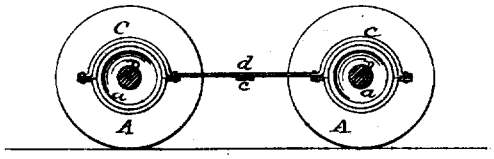

In the drawing, Figure 1 is a plan of a car-truck embodying our invention. Fig. 2 is a longitudinal section of an axle and wheels with the cones and friction-bands. Fig. 3 is a longitudinal vertical section of Fig. 1 taken in the line *x x*, Fig. 2.

Similar letters of reference indicate like parts in the several figures.

A A represent the car-wheels, which are secured to axles B B. The wheels are cast with cones or cone-shaped shells *a* on their inner surface. On the cones are fitted friction bands C C, adapted to be drawn onto the cones and loosened therefrom by any suitable brake mechanism. We prefer to construct the bands C of semicircular sections bolted together at the ends; but any other suitable construction may be employed. The supporting-frame is composed of bearers *b b*, resting on the journal-boxes, connected together by a transverse piece, *c*, carrying the movable bars *d d*, which connect the friction-bands on either side of the car-truck together. The brakes, when not in use, are thus supported entirely from the body of the car, thus relieving the wheels and dispensing with the unpleasant clattering which has been a serious objection to brakes of this class, as heretofore constructed.

In the drawing we have shown brake-operating mechanism consisting of forked rods *e e*, connecting the friction-bands with levers *f f*, pivoted at the under side of the car, and provided with rods or cords *g g*, which are attached to the hand-cranks or other device by means of which power is applied.

The operating mechanism can be greatly varied without departing from the nature of our invention.

Having thus described our invention, what we claim as new, and desire to secure by Letters Patent, is—

1. The cones cast with the wheels and combined with friction-bands encircling the cones, and operated substantially in the manner and for the purpose set forth.

2. The employment of friction-bands adapted to be tightened on cones by being drawn inward from the wheels toward the middle of the axle, substantially as described, for the purpose specified.

To the above we have signed our names this 17th day of December, A. D. 1872.

S. BALKWILL.
W. W. BALKWILL.

Witnesses:
GEO. HESTER,
S. G. BALDWIN.